United States Patent [19]

Pastor et al.

[11] Patent Number: 4,869,893
[45] Date of Patent: Sep. 26, 1989

[54] PREPARATION OF HIGH PURITY COMPOUNDS OF SULFUR, SELENIUM, AND TELLURIUM

[75] Inventors: Ricardo C. Pastor, Manhattan Beach; Luisa E. Gorre, Oxnard, both of Calif.

[73] Assignee: Hughes Aircraft Company, Los Angeles, Calif.

[21] Appl. No.: 83,139

[22] Filed: Aug. 10, 1987

[51] Int. Cl.[4] .................... C01B 17/02; C01B 17/00; C01G 28/00
[52] U.S. Cl. ......................... 423/509; 423/88; 423/133; 423/561.1; 156/DIG. 72
[58] Field of Search ............... 423/88, 509, 219, 133, 423/137, 561 R, 240; 156/DIG. 72

[56] References Cited

U.S. PATENT DOCUMENTS

| | | | |
|---|---|---|---|
| 1,917,725 | 7/1933 | Lenander | 423/88 |
| 2,019,632 | 11/1935 | Ray | 423/219 |
| 2,962,343 | 11/1960 | Goedkoop | 423/219 |
| 4,557,914 | 12/1985 | Modene | 423/509 |
| 4,564,509 | 1/1986 | Shealy et al. | 423/219 |
| 4,579,723 | 4/1986 | Weltmer et al. | 423/219 |

FOREIGN PATENT DOCUMENTS

| | | | |
|---|---|---|---|
| 2548294 | 5/1977 | Fed. Rep. of Germany | 423/509 |
| 44-8091 | 9/1962 | Japan | 423/561 R |
| 812707 | 3/1981 | U.S.S.R. | 423/561 R |

OTHER PUBLICATIONS

Kothiyal et al., Preparation of Arsenic Selenide Crystals and Their Electric and Photoconductive Properties, Journal of Crystal Growth, 1981, pp. 519–522.

*Primary Examiner*—Gary P. Straub
*Attorney, Agent, or Firm*—Denson-Low: Wanda K.; A. W. Karambelas

[57] ABSTRACT

A method for preparing compounds of sulfur, selenium, and tellurium includes the formation of the compound from the elements in a closed environment which excludes oxygen, and then the purification of the compound by contacting it with carbon or carbon monoxide. Oxygen, the principal contaminant in conventionally prepared compounds of this group, is excluded from the formation of the compound in the formation step by using a closed reactor, preferably made of vitreous silica. Oxygen in the initial elemental reactants remains in the compound made in this way, and the purification step eliminates the oxygen originally present in the elemental reactants from the compound. Arsenic triselenide made by this approach, glassy and of high purity, is suitable for use in applications requiring infrared transparency.

9 Claims, 1 Drawing Sheet

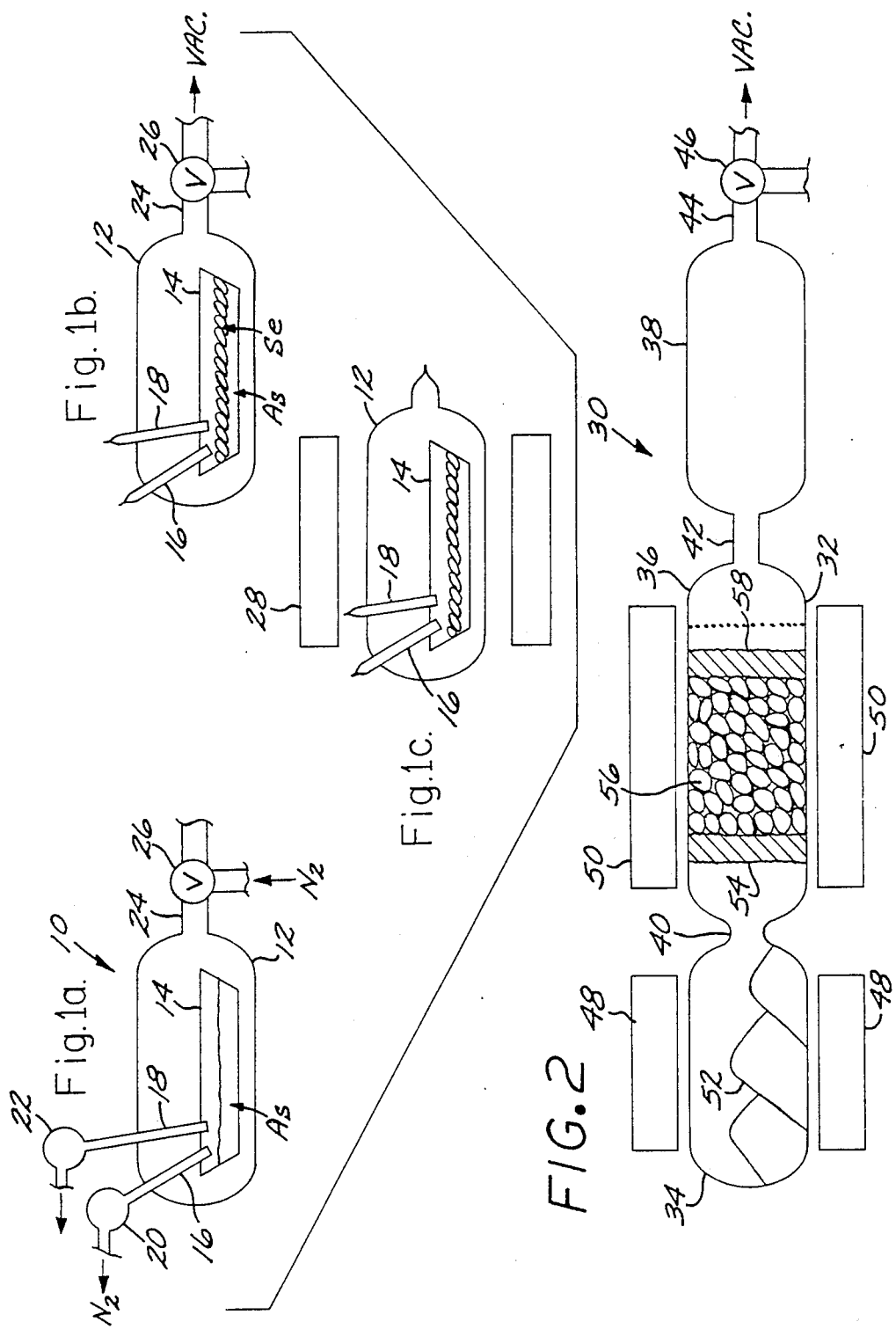

PREPARATION OF HIGH PURITY COMPOUNDS OF SULFUR, SELENIUM, AND TELLURIUM

BACKGROUND OF THE INVENTION

This invention relates to the preparation of high purity inorganic materials, and, more particularly, to the preparation of compounds of sulfur, selenium and tellurium having low contaminant content.

Compounds of sulfur, selenium and tellurium with cations are sometimes termed chalcogenides. A number of such compounds have important technological applications, but their use is inhibited by the inability to prepare the compounds with very low impurity levels, and in particular with low oxygen and oxide contents.

One such compound, arsenic triselenide, having a chemical formula of $As_2Se_3$, is a material having high transparency to light in the infrared range. Of commonly available materials, only KCl has greater transparency to light having a wavelength of 10.6 micrometers. Arsenic triselenide has sufficiently different chemical properties from KCl that it is of interest in a number of infrared applications for use in displays and windows, as well as other uses where KCl cannot be used.

The use of arsenic triselenide has, in the past, been inhibited by the unavailability of this material in a highly purified form, free of oxygen and oxide contamination. Even moderate levels of oxygen or oxide, on the order of about 100 parts per millions or more, can be detrimental to the infrared transparency of arsenic triselenide.

The preparation of arsenic-containing compounds must be done very carefully, as many compounds of arsenic are highly toxic. Arsenic triselenide is conventionally prepared by a sublimation process from the elements. Arsenic sublimes upon heating at atmospheric pressure. In a closed vitreous silica system, arsenic vapor is sublimed from the solid element, transferred via the vapor phase to another chamber containing solid selenium, and reacted with the selenium. It is known that the solid elemental arsenic, from which the vapor is sublimed, contains arsenic oxide in an amount that increases from the center of the arsenic mass to the surface. After the sublimation is complete, a fine residue of arsenic oxide in the form of a web is observed, leading to the belief that the oxide is not transported from the solid arsenic to the compound through the vapor phase, to contaminate the compound. The process thus relies upon the assumption of a distillation-like effect for purification of oxide from the arsenic prior to reaction with the selenium.

Unfortunately, the conclusion that oxide is not transported through the vapor phase during the sublimation process is incorrect. Arsenic triselenide obtained by this process contains a substantial amount of oxygen impurity, typically on the order of above 100 parts per million oxygen. This level of oxygen impairs the infrared transparency of the compound, and makes it technically noncompetitive in most applications.

There therefore exists a need for an improved process for preparing high purity compounds of sulfur, selenium and tellurium. Although the need is most acute for, and has been discussed here in relation to, arsenic triselenide, the use of other compounds of this family are similarly hampered by the unavailability of the high-purity material, free of oxygen, oxide, and other contaminants. Such a process should result in a very low oxygen content for the compound. The present invention fulfills this need, and further provides related advantages.

SUMMARY OF THE INVENTION

The present invention provides a method for preparing compounds of sulfur, selenium and tellurium with elements which do not form stable carbides, the resulting compounds having a very low oxygen content. The method can be readily practiced in a laboratory or production environment. The yield of the reaction is nearly 100 percent, being less than complete only because of loss of impurities.

In accordance with the invention, a method for preparing high purity compounds comprises the steps of forming a compound having a cation that does not form a carbide, and an anion selected from the group consisting of sulfur, selenium, and tellurium, and purifying the compound by contacting it to a reducing agent selected from the group consisting of carbon and carbon monoxide, to remove oxide impurity from the compound.

The step of forming the compound is preferably carried out by furnishing a degassed, sealed vitreous silica boat in a vitreous silica reactor, the boat being charged with sufficient elemental reactants to form the required compound, and heating the boat with the charge therein to a temperature of greater than the melting point of the compound for a period of time sufficient to form the compound, and then cooling the boat to form the solid. Arsenic triselenide is preferably formed in this manner. To form arsenic triselenide, the boat is heated to about 400° C. for about 3 hours, and then to about 600° C. for about 16 hours, before cooling to ambient temperature. The compound can also be formed by vapor phase transport of one of the elemental reactants to the other.

The step of purifying the arsenic triselenide is preferably carried out by furnishing a three-chamber vitreous silica reactor having a center chamber, a left chamber communicating with the center chamber through a constricted left passage, and a right chamber communicating with the center chamber through a constricted right passage, the reactor having the compound in the left chamber and carbon chips in the center chamber, and further having a quartz-wool separator between the carbon chips and the left chamber to prevent movement of carbon chips into the left chamber, and a quartz-wool separator between the carbon chips and the right chamber to prevent movement of carbon chips into the right chamber, applying a vacuum to the reactor through a vacuum port in the right chamber, heating the center chamber to outgas the carbon chips, heating the left chamber to a temperature greater than the melting point of the compound but less than the temperature of the center chamber, while maintaining the center chamber at a temperature greater than the temperature to which the left chamber is heated, thereby causing the compound to vaporize, travel through the center chamber to react the oxide impurities therein with the carbon chips, and condense as the purified compound in the right chamber, and sealing the right chamber with the purified compound therein.

The present method thus involves two steps, formation of the compound while excluding external sources of oxygen contamination, and purifying the compound of internal contamination present in the elements used in forming the compound. By contrast, in the prior approach only a single sublimation step is used, under the erroneous belief that the sublimation procedure itself prevents the presence of oxide in the final compound, and no followup purification step is performed. It has now been discovered that, no matter how carefully the sublimation process is conducted, oxide contamination is transported through the vapor phase to the final compound because such a process is thermodynamically favored.

For example, stoichiometric arsenic trioxide ($As_2O_3$) solid has a vapor pressure of 1 millimeter at a temperature of 212.5° C., and arsenic has a vapor pressure of 1 millimeter at a temperature of 372° C. The sublimation method therefore will result in oxide contamination of the arsenic triselenide. The off-stoichiometric surface oxide of arsenic has a lower vapor pressure, reducing the transfer of oxide, but there is still a finite transfer of oxide in the form of the volatile arsenic oxide from the mass of elemental arsenic to the arsenic triselenide.

The present invention takes a different approach to attain a higher purity final compound. It is recognized that the oxygen contamination can appear from two sources, external oxygen and oxide sources such as water vapor or outgassing products that can enter the compound from sources other than the reactants, and internal oxygen that reaches the compound from the reactants themselves. The external oxygen contaminant is avoided in both the formation and purification steps by using closed reaction systems of a cleanable, impermeable material, preferably vitreous silica, and by carefully outgassing the systems prior to reaction of the elements to obtain the initial, unpurified product.

There is no attempt to remove or avoid the internal oxide contaminant, present primarily on the elemental arsenic prior to reaction, during the formation step. It is accepted that the compound initially formed will have a degree of oxygen contamination, and then this contaminant is removed during the purification step. This approach has three important advantages. First, the reaction of elemental arsenic and elemental selenium can proceed rapidly in the formation step, without the need for great care in an attempt to avoid sublimation of oxide, as in the prior approach. Second, the final purification step removes oxygen from the compound, whatever the source, whether the elements or some unknown outgassing source. Third, the purification step can be used to purify the compounds prepared by processes other than that of the invention, and is completely flexible in that respect.

In the purification step, the oxide is reduced with a reducing agent, but not all reducing agents are applicable. For example, hydrogen gas cannot be used as a reducing agent because hydrogen reduces the compound to the pure metal and $H_2S$, $H_2Se$, or $H_2Te$. Additionally, other subsidiary reactions can occur that interfere with purification. For example, the reaction of hydrogen with arsenic trioxide to produce elemental arsenic and water vapor thermodynamically disfavored at temperatures in the range of about 400° C. to about 700° C., the reasonable range for conducting any reduction.

Only the use of carbon and carbon monoxide as reducing agents is within the scope of the invention, and other reducing agents are excluded for the reasons stated. The reduction of arsenic trioxide by carbon or carbon monoxide, to arsenic metal and carbon dioxide is thermodynamically favored in this same temperature range, having a negative free energy of reaction. In a preferred type of purification reactor developed in accordance with the invention and described subsequently, elemental carbon is used as the reducing agent, and arsenic triselenide in the vapor phase is passed over the carbon.

Thus, in a most preferred embodiment of the invention, using both the preferred formation approach and the preferred purification approach, a method for preparing arsenic triselenide of high purity comprises the steps of forming arsenic triselenide, by the substeps of furnishing a degassed, sealed vitreous silica boat in a vitreous silica reactor, the boat being charged with sufficient arsenic and selenium to react to form $As_2Se_3$, heating the boat with the charge therein to a temperature of greater than the melting point of arsenic triselenide for a period of time sufficient to form $As_2Se_3$, and then cooling the boat to form the solid; and purifying the arsenic triselenide with carbon to remove the oxide therefrom, by the substeps of furnishing a three-chamber vitreous silica reactor having a center chamber, a left chamber communicating with the center chamber through a constricted left passage, and a right chamber communicating with the center chamber through a constricted right passage, the reactor having arsenic triselenide in the left chamber and carbon chips in the center chamber, and further having a quartz-wool separator between the carbon chips and the left chamber to prevent movement of carbon chips into the left chamber, and a quartz-wool separator between the carbon chips and the right chamber to prevent movement of carbon chips into the right chamber, applying a vacuum to the rector through a vacuum port in the right chamber, heating the center chamber to outgas the carbon chips, heating the left chamber to a temperature greater than the melting point of arsenic triselenide but less than the temperature of the center chamber, while maintaining the center chamber at a temperature greater than the temperature to which the left chamber is heated, thereby causing the arsenic triselenide to vaporize, travel through the center chamber to react the oxide impurities therein with the carbon chips, and condense as purified arsenic triselenide in the right chamber, and sealing the right chamber with the purified arsenic triselenide therein.

The arsenic triselenide resulting from the process of the invention has a purity greater than available by any other conventional production process. It is in a glassy form that is suitable for use in infrared applications, because of the reduced oxide contaminant levels.

The present method provides an advance in the art of preparing arsenic triselenide in a high purity form, with substantially no oxide contamination that would interfere with infrared transmission. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a series of three side sectional views of the reactor used for forming the arsenic triselenide from the elements, illustrating (A) addition of the elements to the reactor, (B) evacuation of the reactor, and (C) reaction of the elements to form the compound; and FIG. 2 is a side sectional view of the reactor used for purifying the arsenic triselenide.

DETAILED DESCRIPTION OF THE PREFERRED EMBODIMENT

The preferred embodiment of the invention involves a reaction of formation of arsenic triselenide, in the apparatus pictured in FIG. 1. and subsequent purification of the arsenic triselenide, in the apparatus pictured in FIG. 2.

Referring to FIG. 1, a compound formation apparatus 10 includes a reactor 12 in the form of a closed vessel, preferably made of vitreous silica. A reaction boat 14, preferably made of vitreous silica, is sealed into the reactor 12. The reactor 12 has two material feedthroughs 16 and 18 that are joined to, and communicate with the interior of, the reactor 12, with containers 20 and 22 communicating therewith for holding measured amounts of arsenic and selenium, respectively. The feedthroughs 16 and 18 are tubes through the top of the reactor 12, preferably made of vitreous silica so that they can be readily fabricated and joined to the reactor 12. A gas line 24 is joined to, and communicates with the interior of, the reactor 12, preferably at the end remote from the point of attachment of the feedthroughs 16 and 18. The gas line 24 has a three-way valve 26 therein, so that in one position a flow of purge gas through the reactor 12 can be maintained, in another position a vacuum can be drawn on the reactor 12, and in a third position the reactor 12 is sealed off.

Prior to introducing any reactants, the apparatus 10 is flamed with a torch to drive off gases that may be adsorbed on the interior walls, under a nitrogen flow or, alternatively, under vacuum. This reduces the amount of oxygen, as molecular oxygen, water vapor, or other forms, that can enter the reactants or the reaction product during the actual reaction procedure.

Arsenic is furnished bottled in a sealed ampoule which is cooled under liquid nitrogen with a nitrogen counterflow. Pieces of arsenic are transferred into the container 20, through the feedthrough 16, and into the boat 14. The weight of the arsenic added is determined by the weight of the ampoule before and after transfer. Selenium is added to the container 22 and transferred through the feedthrough 18 to the boat 14. Both transfers are made under flowing nitrogen atmospheres. After each transfer is complete, the respective feedthrough is tipped off by standard glassblowing procedures to seal the reactor 12, as illustrated in FIG. 1B. In the case of the selenium feedthrough 18, the nitrogen flow is gradually reduced at the flow controller as the tip is formed. After the selenium addition is complete and the feedthrough 18 is tipped off, the valve 26 is switched so that a vacuum is drawn on the interior of the reactor 12. With a vacuum being drawn, the gas line 24 is tipped off by glassblowing techniques, yielding the configuration of FIG. 1C.

The purpose of the procedure just described is to place the proper weights of arsenic and selenium into the reactor 12, while minimizing the amount of oxygen and oxygen sources available to react during subsequent heating, and to alter the reactor 12 into a closed vessel that is essentially impervious to any further introduction of "outside" oxygen into the reactor 12 during subsequent steps. The amount of arsenic actually added can be obtained by weighing the ampoule after the arsenic is added, and subtracting its initial weight. The amount of selenium is then calculated from the desired composition $As_2Se_3$. Preferably, a slight excess of selenium is added, so that there will be an amount of selenium vapor to fill the volume of the reactor 12, at the sublimation point of arsenic triselenide, 360° C.

The arsenic triselenide is formed from the reactants arsenic and selenium, within the reactor 12, by heating the reactor 12 in a furnace 28 to an appropriate reaction temperature. The times and temperatures can depend upon the volume of material to be reacted. In a typical example, sufficient arsenic and selenium were added to make a total of 150 grams of arsenic triselenide. The preferred reaction times and temperatures were 400° C. for 3 hours, then 600° C. for 16 hours, and gradual cooling to 360° C. The reactor 12 was removed from the furnace 28 and quenched in air. Formation of the arsenic triselenide was complete.

As previously discussed, it is understood that the arsenic triselenide so formed contains oxygen impurity, probably from several sources. One such source is the arsenic oxide on the surface of the arsenic pieces added to the reactor 12, and there may be others. The next portion of the procedure, accomplished in a apparatus 30 illustrated in FIG. 2, purifies the arsenic triselenide of a large portion of the oxygen and oxide impurity, as well as other reducible impurities.

The apparatus 30 includes a three chamber reactor 32, preferably constructed of vitreous silica. The three chambers are termed a left chamber 34, a center chamber 36, and a right chamber 38. The left chamber 34 is joined to, and communicates with, the center chamber 36 by a left passage 40. The right chamber 38 is joined to, and communicates with, the center chamber 36 by a right passage 42. A gas line 44 is joined to, and communicates with, the right chamber 38. The gas line 44 includes a three-way valve 46, which permits a gas flow to be introduced into the reactor 32, a vacuum to be drawn, or the reactor to be sealed. There is provided means to heat the left chamber 34 and the center chamber 36 to different temperatures. In the illustrated embodiment, this result is accomplished by supplying a left furnace 48 over the left chamber 34, and a center furnace 50 over the center chamber 36.

To conduct the purification operation, a charge 52 of arsenic triselenide, prepared by the preferred process just described or another process, is first introduced into the left chamber 34. A separator material 54 is inserted into the center chamber 36 to about the point of the left passage 40. The separator material, preferably quartz wool, is selected to permit hot arsenic triselenide vapor to pass therethrough in a subsequent step, but to prevent passage of solids. Carbon chips 56 are placed into the center chamber 36. A second separator 58 is then inserted. The function of the two separators 54 and 58 is therefore to retain the carbon chips within the center chamber 36. The insertion of the arsenic triselenide, separator materials, and carbon chips is facilitated by supplying the left chamber 34 and center chamber 36 joined together, and then joining the right chamber 38 to the right passage 42 after insertion is complete, under a flow of nitrogen to prevent further oxidation of the arsenic triselenide or adsorption of more oxygen onto the interior walls of the reactor 32.

The valve 46 is operated to apply a vacuum to the interior of the reactor 32. The vacuum need not be high, and a $10^{-2}$ Torr vacuum is sufficient. The carbon chips 56 and the center chamber 36 are gradually heated with the furnace 50 and with the vacuum applied, to cause outgassing and removal of potentially harmful gases, including oxygen. The preferred temperature is 900° C. Upon completion of this outgassing, the left chamber 36 and the impure arsenic triselenide therein are heated to a temperature above the sublimation temperature of arsenic triselenide, about 360° C., by the furnace 48. The preferred temperature of heating is 500° C. Arsenic triselenide vapor, possibly including impurity vapors such as free oxygen or oxygen compounds, passes through the separator 54 and into the bed of carbon chips 56. The oxygen and oxides, as well as other reducible species, are reduced by reaction with the carbon, to produce carbon monoxide which is usually further oxidized to carbon dioxide. The gaseous oxidation products are pumped away through the gas line 44. If any solid oxidation products are produced, they precipitate on the carbon chips 56 or the separator 58 as the purified arsenic triselenide vapor passes therethrough. The arsenic triselenide vapor enters the cool right chamber 38, and is condensed therein to form a glassy deposit. Complete vapor phase transport and purification of 50 grams of arsenic triselenide requires about 1 hour by this technique. Upon completion of the purification process, the solid, purified arsenic triselenide resides in the right chamber 38. To store or transport the purified compound, the right passage 42 is tipped off under vacuum, and then the gas line 44 is tipped off between the right chamber 38 and the valve 46, to form an ampoule containing the arsenic triselenide.

The following examples illustrate embodiments of the invention, but should not be taken as limiting of the invention in any way.

EXAMPLE 1

Arsenic triselenide, $As_2Se_3$, was formed by reacting 28.2 grams of As with 44.58 grams of Se in the manner previously described and with the apparatus of FIG. 1. The heating was done at 400° C. for 3 hours and 600° C. for 16 hours. The resulting impure compound was purified in the apparatus of FIG. 2, using the method previously described. IR analysis of the evaporated and recondensed material showed no trace of hydroxide ion absorption.

EXAMPLE 2

Indium selenide, $In_2Se_3$, was formed by reacting 137.4 grams of In and 142.2 grams of Se in the same approach as described in Example 1, with the same results, except that the heating was at 310° C. for 16 hours and at 480° C. for 3 hours.

EXAMPLE 3

Arsenic sulfide, $As_2S_3$, was formed by reacting 28.3 grams of As and 21.07 grams of S in the same procedure as described in Example 1, with the same results, except that the heating was at 400° C. for 3 hours and at 500° C. for 16 hours.

EXAMPLE 4

Indium sulfide, $In_2S_3$, was formed by reacting 228.4 grams of In and 96.19 grams of S in the same approach as described in Example 1, with the same results. However, in the apparatus of FIG. 1 the reactants were provided in two separate boats at each end of the tube, and were separately heated to different temperatures by different furnaces. The In was heated to 850° C. and the S to 490° C., both for 24 hours. By vapor phase transfer, the S and In reacted to form the compound.

EXAMPLE 5

Antimony sulfide, $Sb_2S_3$, was formed by reacting 60.87 grams of Sb and 26.2 grams of S in the same approach as described in Example 1, with the same results. However, in the apparatus of FIG. 1 the reactants were provided in two separate boats at each end of the tube, and were separately heated to different temperatures by different furnaces. The Sb was heated to 600° C. and the S to 400° C., both of 48 hours. By vapor phase transfer, the Sb and S reacted to form the compound.

EXAMPLE 6

Indium telluride, $In_2Te_3$, was formed by reacting 18.75 grams of In and 31.25 grams of Te in the same approach as described in Example 1, with the same results, except that the heating sequence was 550° C. for 41 hours, 600° C. for 7 hours, and 670° C. for 88 hours.

It is apparent that the present invention provides a safe method for preparing arsenic triselenide and other compounds of sulfur, selenium and tellurium, of high purity, and in particular having reduced oxide content. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing high purity compounds of sulfur, selenium and tellurium comprising the steps of:
   (a) forming compound selected from the group consisting of $As_2Se_3$, $As_2S_3$, $In_2Te_3$, $In_2Se_3$, $Sb_2S_3$ and $In_2S_3$;
   (b) purifying the compound by vaporizing it and contacting the vaporized compound with a reducing agent selected from the group consisting of carbon and carbon monoxide to remove oxide impurities; and
   (c) condensing the purified compound.

2. The process of claim 1, wherein the compound is $As_2Se_3$ which is heated to about 400° C. for about 3 hours, and then to about 600° C. for about 16 hours during the forming step.

3. The process of claim 1, wherein the compound is $As_2Se_3$ which is formed during the forming step from an excess of selenium that is above the stoichiometric requirements for $As_2Se_3$.

4. A method for preparing arsenic triselenide of high purity, comprising the steps of:
   (a) reacting arsenic and selenium in a closed glass container to form arsenic triselenide, which container has been degassed prior to said step of reacting;
   (b) purifying the arsenic triselenide by vaporizing it and contacting the vaporized arsenic triselenide with a reducing agent selected from the group consisting of carbon and carbon monoxide to remove oxide impurities in the arsenic triselenide; and
   (c) condensing the purified arsenic triselenide.

5. A method for preparing arsenic triselenide of high purity, comprising the steps of:
   (a) furnishing a degassed, sealed vitreous silica boat in a vitreous silica reactor, the boat being charged with sufficient arsenic and selenium to react to form $As_2Se_3$;

(b) heating the boat with the charge therein to a temperature of greater than the melting point of arsenic triselenide for a period of time sufficient to form $As_2Se_3$, and then cooling the boat to form the solid;

(c) purifying the arsenic triselenide with carbon to remove the oxide therefrom, by furnishing a three-chamber vitreous silica reactor having a center chamber, a left chamber communicating with the center chamber through a constricted left passage, and a right chamber communicating with the center chamber through a constricted right passage, the reactor having arsenic triselenide in the left chamber and carbon chips in the center chamber, and further having a quartz-wool separator between the carbon chips and the left chamber to prevent movement of carbon chips into the left chamber, and a quartz-wool separator between the carbon chips and the right chamber to prevent movement of carbon chips into the right chamber;

(d) applying a vacuum to the reactor through a vacuum port in the right chamber;

(e) heating the center chamber to outgas the carbon chips;

(f) heating the left chamber to a temperature greater than the melting point of arsenic triselenide but less than the temperature of center chamber, while maintaining the center chamber at a temperature greater than the temperature to which the left chamber is heated, thereby causing the arsenic triselenide to vaporize, travel through the center chamber to react the oxide impurities therein with the carbon chips, and condense as purified arsenic triselenide in the right chamber; and (g) sealing the right chamber with the purified arsenic triselenide therein.

6. The process of claim 5 wherein the heating of the boat is to about 400° C. for about 3 hours, and then to about 600° C. for about 16 hours.

7. The process of claim 5 wherein the boat contains an excess of selenium above the stoichiometric requirement for $As_2Se_3$.

8. The process of claim 5 wherein the left section is heated to a temperature of about 500° C. and the center section is maintained at a temperature of about 900° C. during said substep of heating the left chamber.

9. A method of preparing arsenic triselenide of high purity comprising the steps of:

(a) forming arsenic triselenide from arsenic and selenium; and (b) purifying the compound by furnishing a three-chamber vitreous silica reactor having a center chamber, a left chamber communicating with the center chamber through a constricted left passage, and a right chamber communicating with the center chamber through a constricted right passage, the reactor having the compound to be purified in the left chamber and carbon chips in the center chamber, and further having a quartz-wool separator between the carbon chips and the left chamber to prevent movement of carbon chips in the left chamber, and a quartz-wool separator between the carbon chips and the right chamber to prevent movement of carbon chips into the right chamber:

(c) applying a vacuum to the reactor through a vacuum port in the right chamber;

(d) heating the center chamber to outgas the carbon chips;

(e) heating the left chamber to a temperature of about 500° C. while maintaining the center chamber at a temperature of 900° C., thereby causing the compound to vaporize, and travel through the center chamber to react the oxide impurities therein with the carbon chips, and condense as the purified compound in the right chamber; and (f) sealing the right chamber with the purified compound therein.

* * * * *